United States Patent [19]

Avrill

[11] Patent Number: 4,975,061

[45] Date of Patent: Dec. 4, 1990

[54] CHILD'S HOLIDAY CALENDAR

[76] Inventor: Maxine S. Avrill, 521 E. Neal St., Gonzales, La. 70737

[21] Appl. No.: 439,155

[22] Filed: Nov. 20, 1989

[51] Int. Cl.[5] .............................................. G09B 19/00

[52] U.S. Cl. ...................................... 434/304; 40/107; 434/429

[58] Field of Search ........................ 434/429, 304, 438; 40/618, 122, 107, 611; 446/901

[56] References Cited

U.S. PATENT DOCUMENTS

| | | | |
|---|---|---|---|
| 589,180 | 8/1897 | Lamb | 434/429 X |
| 1,506,156 | 8/1924 | Bjorklund | 434/429 |
| 2,369,804 | 2/1945 | Schoolfield et al. | 446/901 X |
| 2,512,485 | 6/1950 | Cougias | 434/238 |
| 2,914,871 | 12/1959 | Smith et al. | 40/107 |
| 2,914,873 | 12/1959 | Brennan | 446/901 X |
| 3,057,473 | 10/1962 | Stern et al. | 206/464 |
| 3,099,352 | 7/1963 | Aven | 206/466 |
| 3,207,421 | 9/1965 | Hunger et al. | 40/122 X |
| 3,274,706 | 9/1966 | Friend | 446/901 X |
| 3,458,944 | 8/1969 | Jimenez | 40/618 X |
| 3,983,649 | 10/1976 | Ellis et al. | 40/122 |
| 4,058,916 | 11/1977 | Whyatt | 40/107 |
| 4,372,077 | 2/1983 | Balbuena | 434/429 X |
| 4,643,451 | 2/1987 | Coates | 283/56 |
| 4,702,700 | 10/1987 | Taylor | 434/429 X |
| 4,776,799 | 10/1988 | Walsh | 434/238 |
| 4,858,350 | 8/1989 | Malarchik | 40/122 X |
| 4,863,386 | 9/1989 | Maxey | 434/304 |

*Primary Examiner*—Richard J. Apley
*Assistant Examiner*—Rachel M. Healey
*Attorney, Agent, or Firm*—Leon Gilden

[57] ABSTRACT

A child's holiday calendar is arranged for enabling children to visually ascertain the approach of a holiday without a reading requirement associated therewith. The calendar includes a matrix of pockets of a predetermined number to include the date of the month prior to and including the holiday date. An underlying opaque pouch is utilized for storage of various visual markers, such as candy, marking spheres, and the like, wherein a child may visually ascertain an approach of an impending holiday as the markers sequentially removed from the associated pockets. The pockets may be prenumbered, or alternatively may utilize removable date cards or fanciful figures attachable to the portion of the support sheet overlying each pocket.

1 Claim, 4 Drawing Sheets

CHILD'S HOLIDAY CALENDAR

BACKGROUND OF THE INVENTION

1. Field of the Invention

The field of invention relates to calendar organization, and more particularly pertains to a new and improved child's holiday calendar wherein the same enables visual understanding of approach of an impending holiday prior to a child's ability to read.

2. Description of the Prior Art

The use of reminder calendars of various types are known in the prior art. The calendars have heretofore been of a configuration to accommodate storage of assortment of items, but have not been related to a particular date of the calendar month associated with each calendar. For example, U.S. Pat. No. 3,208,421 to Hunger provides a reminder device wherein the same utilizes a matrix of pockets associated with each day of an associated month wherein the pockets secure various items, such as vitamins, medicine and the like for consumption by an individual and are not utilized for indicator purposes, as provided for by the instant invention.

U.S. Pat. No. 3,099,352 to Aven sets forth a calendar reminder and dispenser wherein dosage strips are positioned overlying each calendar date to enable dispensing of the strip upon an approach of the date.

U.S. Pat. No. 3,057,473 to Stern provides a dispensing calendar wherein a vitamin dosage is positioned within an enclosed package oriented and arranged for consumption by an individual consistent with each date.

U.S. Pat. No. 3,983,649 to Ellis provides a reminder card wherein a rack is provided with a plurality of columns with inidicia related to each column to accommodate notes and the lik positioned within each of the pockets.

U.S. Pat. No. 4,643,451 to Coates provides an envelope receiving a plurality of coupons and the like wherein pockets are positioned within the envelope to provide retention of slips of paper and the like over a period of time for storage thereof to enable an individual to remove such items consistent with a predetermined date for redemption by a store.

As such, it may be appreciated that there is a continuing need for a new and improved child's holiday calendar which addresses the problem of ease of use by children prior to their ability to read and further addresses the problem of ease of use by an individual to accommodate such children.

SUMMARY OF THE INVENTION

In view of the foregoing disadvantages inherent in the known types of calendar devices now present in the prior art, the present invention provides a child's holiday calendar wherein the same utilizes a matrix of pockets to temporarily position visual markers for association with a target date of a predetermined month associated with a calendar. As such, the general purpose of the present invention, which will be described subsequently in greater detail, is to provide a new and improved child's holiday calendar which has all the advantages of the prior art calendar devices and none of the disadvantages.

To attain this, the present invention includes a child's holiday calendar arranged for enabling children to visually ascertain the approach of a holiday without a reading requirement associated therewith. The calendar includes a matrix of pockets of a predetermined number to include the date of the month prior to and including the holiday date. An underlying opaque pouch is utilized for storage of various visual markers, such as candy, marking spheres, and the like, wherein a child may visually ascertain an approach of an impending holiday as the markers are sequentially removed from the associated pockets. The pockets may be prenumbered, or alterntively may utilize removable date cards attachable to the portion of the support sheet overlying each pocket.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child's holiday calendar which has all the advantages of the prior art calendar devices and none of the disadvantages.

It is another object of the present invention to provide a new and improved child's holiday calendar which may be easily and efficiently manufactured and marketed.

It is a further object of the present invention to provide a new and improved child's holiday calendar which is of a durable and reliable construction.

An even further object of the present invention is to provide a new and improved child's holiday calendar which is susceptible of a low cost of manufacture with regard to both materials and labor, and which accordingly is then susceptible of low prices of sale to the consuming public, thereby making such child's holiday calendars economically available to the buying public.

Still yet another object of the present invention is to provide a new and improved child's holiday calendar which provides in the apparatuses and methods of the prior art some of the advantages thereof, while simultaneously overcoming some of the disadvantages normally associated therewith.

Still another object of the present invention is to provide a new and improved child's holiday calendar wherein the same provides for visual indication of approach of an impending holiday date of an associated month.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
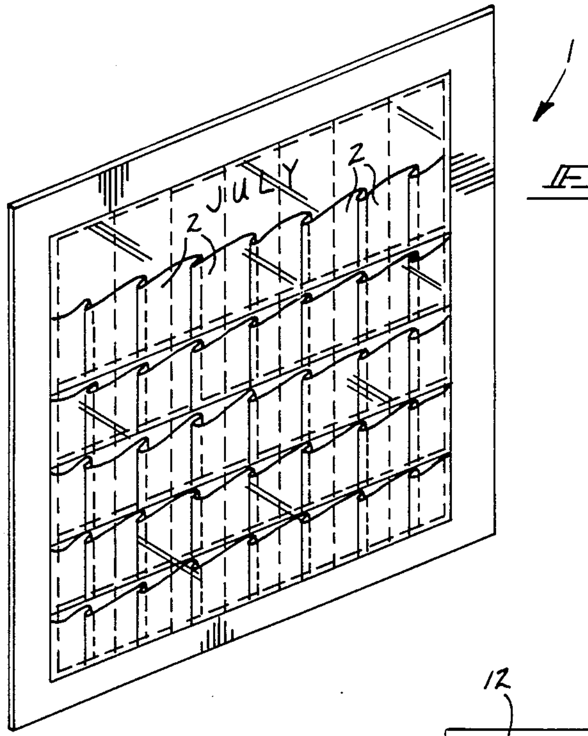
FIG. 1 PRIOR ART
FIG. 1 is an isometric illustration of a prior art device.

With reference now to the drawings, and in particular to FIGS. 1 to 8 thereof, a new and improved child's holiday calendar embodying the principles and concepts of the present invention and generally designated by the reference numerals 10 and 10*a* will be described.

Mores specifically, the child's holiday calendar 10 comprises an improvement over the prior art calendar device 1 wherein a matrix of pockets 2 are positioned on a support base for support of various items, such as vitamins, medicine, and the like, for dispensing during the predetermined date associated with each pocket.

Figure 2:
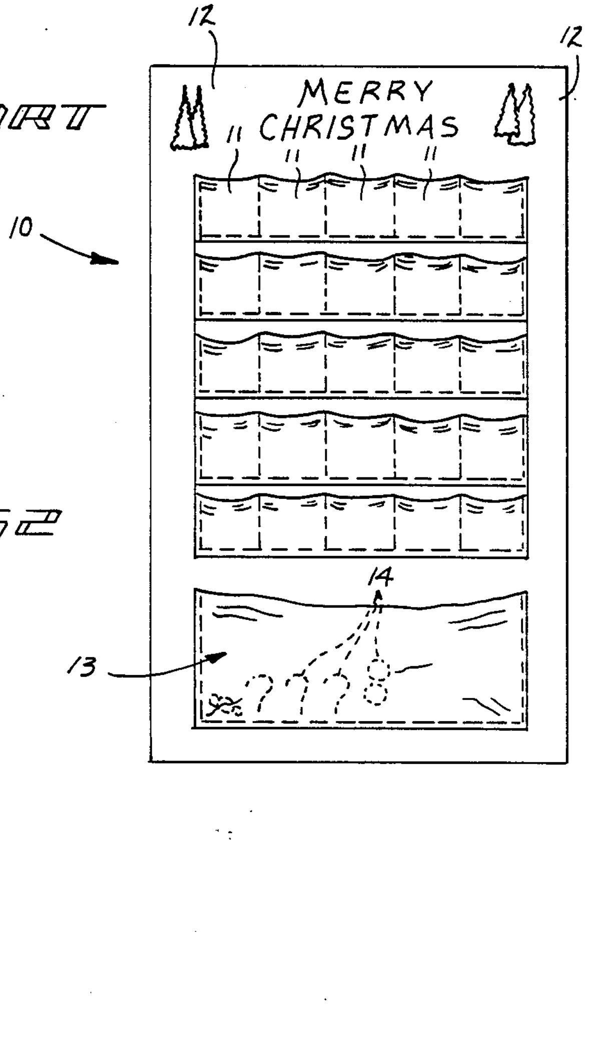
FIG. 2 is an orthographic view taken in elevation of the instant invention.

The child's holiday calendar 10, as illustrated in FIG. 2, includes a matrix of pockets 11 that are preferably transparent mounted upon a rigid planar support sheet 12. The pockets 11 are of a number consistent with the date of the associated holiday, wherein for example a Christmas holiday calendar, as illustrated in FIG. 2, would include twenty-five pockets, as the additional pockets are necessary as the target date of the holiday and its associated awareness by a child is the basis of the invention's direction of teaching to a young child.

Figure 3:
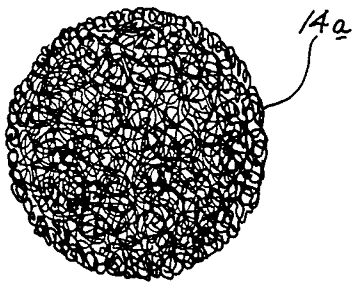
FIG. 3 is an orthographic view taken in elevation of a felt marking sphere utilized by the instant invention.
Figure 4:
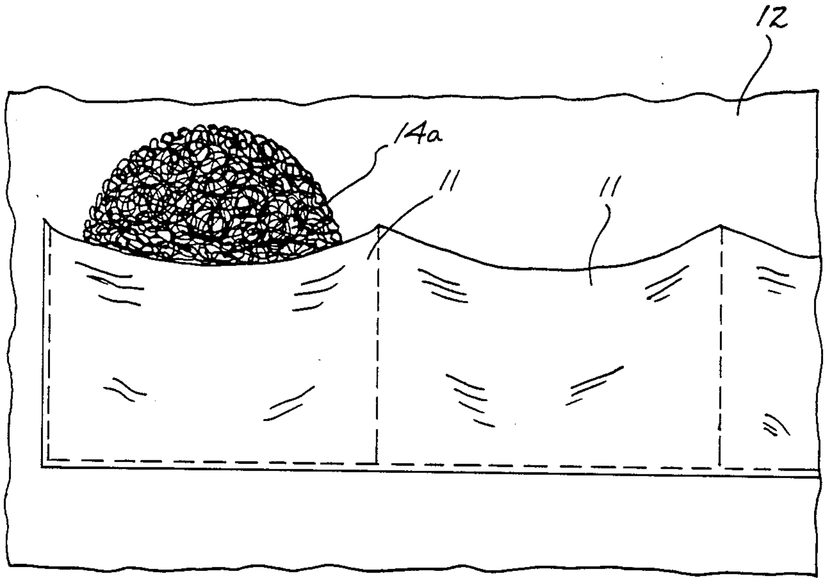
FIG. 4 is an orthographic view taken in elevation of the sphere illustrated in FIG. 3 in use with a calendar device.

The calendar 10 further includes an opaque storage pocket 13 positioned underlying the matrix of individual pockets 11 and is of a lineal extent substantially equal to that defined by the predetermined width of the pocket matrix positioned above. Visual markers 14 are stored within the storage pocket 13 for positioning and sequential removal on a day by day basis. For example, candy and the like may be utilized or individual predetermined markers, such as illustrated in FIG. 3, such as felt markers 14*a*, may be contained within the storage pocket 13 and initially positioned within each of the pockets 11, whereupon they are sequentially removed and replaced within the storage pocket 13 until all of the markers 14*a* are removed from all of the associated respective pockets consistent with the approach of the impending holiday dates, such as December 25th associated with Christmas.

Figure 5:
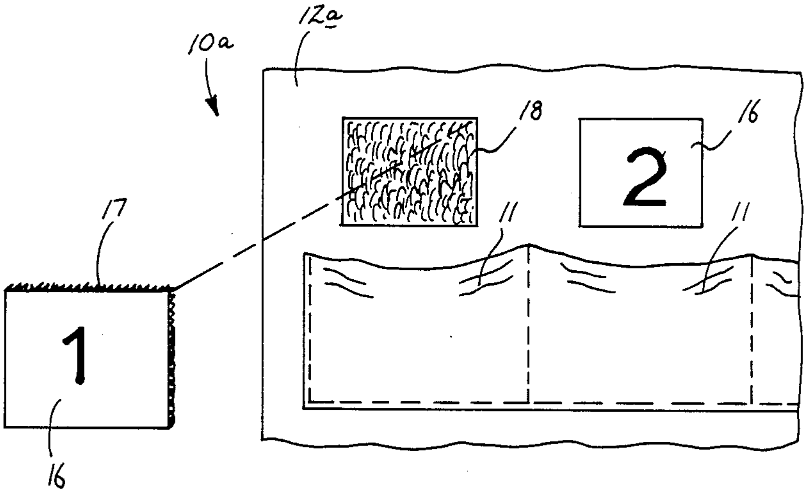
FIG. 5 is an orthographic view taken in elevation of a modified child's holiday calendar utilizing date cards temporarily securable to the calendar.
Figure 6:
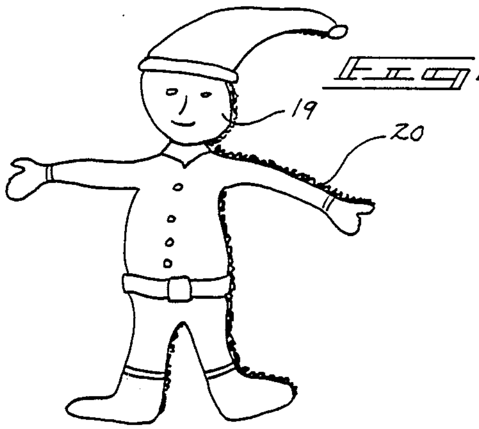
FIG. 6 is an orthographic view taken in elevation of a fanciful figure utilized by the instant invention.
Figure 7:
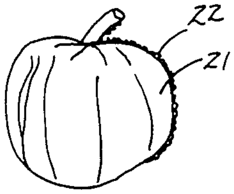
FIG. 7 is an orthographic view taken in elevation of a further fanciful configuration utilized by the instant invention.

FIG. 5 illustrates a modified child's holiday calendar arrangement 10*a* wherein the pockets 11 mounted upon an associated rigid planar support sheet 12*a* each include an individual date card 16 formed of a rigid square configuration formed with a first hook and loop fastener patch surface 17 coextensive about a rear surface of each date card 16 for overlying and selective securement to a second hook and loop fastener patch 18 positioned over each respective pocket and of an area and configuration equal to the associated date card 16 to provide a rudimentary understanding to a child of a counting system associated with the month as a child progresses to that level of understanding. FIG. 6 is a fanciful figure 19 formed with a figure fastener surface 20 formed of hook and loop fasteners for securement to the associated patch 18 associated with a target date, such as Dec. 25th, or the 25th pocket. The illustration of FIG. 7 setting forth a holiday marker 21 formed with a holiday marker hook and loop fastener patch surface 22 exemplifies a marker for use in a various month such as October, consistent with Halloween for example.

Figure 8:
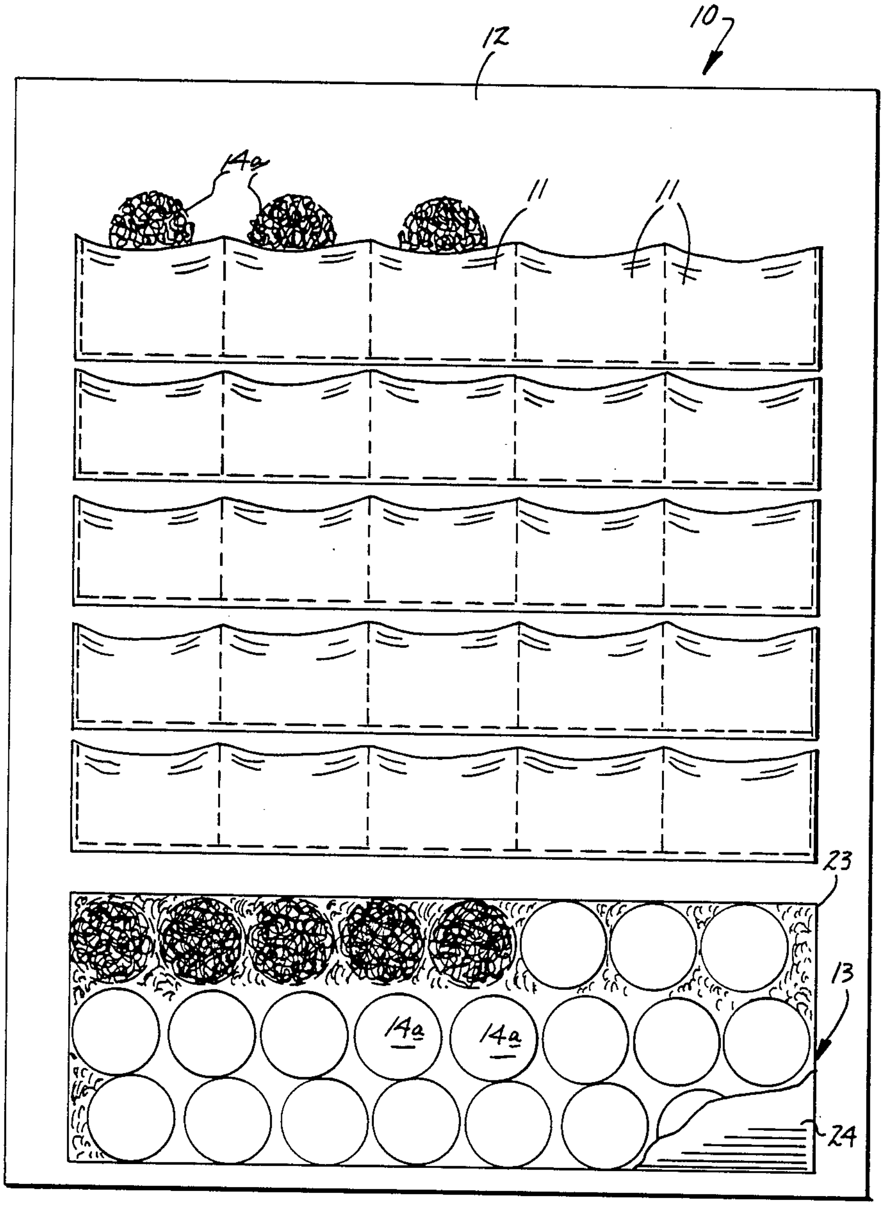
FIG. 8 is an orthographic view taken in elevation of the marking spheres utilized by the instant invention in combination with the storage pocket.

FIG. 8 illustrates the use of the felt marking spheres 14*a* mounted within the pockets 11 and their storage within the storage pocket 13 illustrating the use of an opaque flexible cover 24 overlying a hook and loop patch fastener surface 23 to position the spheres in orderly arrangement and prevent their descending to a lowermost portion of the pocket and enable their removal and subsequent orderly repositioning within the pocket 13 subsequent to their use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An instructional holiday calendar comprising, a planar support sheet, and a matrix of pockets defining a predetermined width symmetrically arranged about an upper forward surface of the support sheet, wherein the pockets are arranged for reception of individual visual indicator markers therewithin, and a storage pocket mounted on the upper forward surface of the support sheet below the matrix of pockets, and wherein the storage pocket is of a length equal to the predetermined width of the matrix of pockets, and wherein a predetermined number of visual indicator markers are mounted within the storage pocket, the predetermined number of visual indicator markers equal to a predetermined number of pockets of the matrix of pockets, and wherein the matrix of pockets are each transparent, and the storage pocket is opaque, and wherein the storage pocket defines an opaque outer flexible cover overlying a hook and loop fastener storage surface, and the hook and loop fastener storage surface is mounted coextensively underlying the opaque flexible cover, and the visual indicator markers include a fabric covering for the visual indicator markers include a fabric covering for securement to the hook and loop fastener storage surface for orderly positioning of the visual indicator markers within the storage pocket, and further including a rigid date card selectively securable above each pocket of the matrix of pockets, wherein the date card includes a first hook and loop fastener surface coextensive about a rear surface of the date card and a second hook and loop fastener surface of a predetermined area and configuration equal to that defined by the date card mounted above each pocket of the matrix of pockets for selective securement of an individual date card above each pocket, and further including a fanciful figure including a fanciful figure hook and loop fastener surface formed on the rear surface of the fanciful figure for securement to said second hook and loop fastener surface overlying a predetermined target date consistent with a predetermined holiday associated with a single pocket of the matrix of pockets.

* * * * *